2,978,348

Patented Apr. 4, 1961

2,978,348

METHOD AND COMPOSITION FOR PRESERVING FOLIAGE

George R. Fessenden, Baltimore, Md., assignor to Claymore C. Sieck, Baltimore, Md.

No Drawing. Filed May 6, 1957, Ser. No. 657,018

12 Claims. (Cl. 117—3)

This invention relates to the preservation of plant foliage and it is more particularly concerned with methods of preserving such foliage and compositions of matter for use in the method, as well as the product resulting from the preservation treatment.

The general object of this invention is the provision of such compositions of matter and method of preservation which will result in a treated foliage having high retentive characteristics with respect to shape, texture, strength and flexibility over a wide range of temperature and humidity conditions. Foliage treated by the methods and compositions of the prior art lack one or more of these retentive characteristics, each of which and the combination of all of which are considered important and necessary. The combination of all these preservation features is, therefore, a result that has long been sought, but which has not heretofore been attained.

Another object of the invention is the provision of such a method and composition by which the preserved foliage is strong enough to withstand handling and transportation conditions and changes in weather or atmospheric conditions usually encountered commercially.

A further object of the invention is the provision of such a composition which is relatively inexpensive and which can be stored for prolonged periods without deterioration and without losing its effectiveness.

A still further object is the provision of such a method which does not require highly skilled labor for commercial usage and which is not harmful or dangerous to persons using it in the prescribed manner.

A still further object is the provision of foliage which has been treated in such a way as to be resistant for prolonged periods to deterioration and yet has the appearance and texture of the foliage in its natural untreated state.

In general, the method of this invention comprises the steps of immersing the foliage to be treated, including the foliage of shrubs, trees and ferns, in an aqueous solution comprising essentially a humectant having bactericidal and germicidal properties; a water-soluble salt of aluminum; an alkaline salt of an acid, the acid radical of which is capable of forming insoluble salts with aluminum under alkaline conditions, but not under acid conditions; and a volatile organic acid in sufficient quantity to maintain the solution at a pH generally unfavorable to the formation of the insoluble salt and which will usually be below 6. The foliage is permitted to remain immersed in this aqueous solution until it becomes permeated therewith. It is then removed from the solution and the free volatile constituents which have been absorbed by the foliage are permitted to evaporate therefrom. As the volatile acid evaporates the pH of the solution remaining in the foliage rises, permitting a reaction to take place between the aluminum ions and the alkaline salt to form the water insoluble aluminum salt which remains as a precipitate in the tissues.

The precipitated aluminum salt acts to retain the foliage in its natural shape and in conjunction with this, the aliphatic amine salt maintains the strength and texture of the foliage under varying conditions of humidity.

The resulting foliage thus treated is in a state of preservation and will resist deterioration for long periods. It will also withstand the usual handling and transportation conditions and have a natural shape, texture, strength and flexibility.

Particularly effective alkaline salts for use in the aqueous treating solution are the sodium, potassium, and ammonium borates, molybdates and phosphates.

The humectant may be a neutral salt of an aliphatic amine having bactericidal and germicidal properties. Such salts formed with boric, hydrochloric, molybdic, phosphoric, sulfamic, or sulfuric acids are preferred and are particularly effective.

Particularly effective water-soluble salts of aluminum are the acetate, formate, glycolate, lactate and sulfate salts.

Suitable volatile organic acids are the acetic, formic, propionic, and butyric acids.

The principal treating solution may include any of the usual dyes to give the foliage a desired color, natural or otherwise.

If desired, the natural permeability of any foliage to be treated may be increased by any pretreatment for this purpose that does not adversely affect the foliage, such as with an aqueous solution of ammonium sulfite or an alkali sulfite such as sodium sulfite, sodium hydrosulfite, sodium metabisulfite, potassium metabisulfite, and the like. Also effective for this purpose are aqueous solutions of acetic acid or of an acetic or a formic acid salt of ammonium. Also effective are such acid salts of an alkali or an alkali metal. A solution of ammonium borate or of an alkali borate may also be used for this purpose.

The foliage after being treated to increase its permeability may be bleached by any of the usual processes known such as with peracetic acid, sodium chlorite, chlorine dioxide, and/or hydrogen peroxide in solutions prepared and applied as is well known in the art.

After the volatile ingredients have evaporated, it is sometimes desired to increase the resistance of the final product to moisture and/or combustion. This is accomplished by introducing into the foliage tissues such water-insoluble substances as alkyl and/or aryl phosphate compounds, including tributyl phosphate and tricresyl phosphate, castor oil, dehydrogenated castor oil, paraffin, chlorinated diphenyl compounds, and silicone compounds. Any one or more of these compounds are dissolved in a non-polar substantially water-immiscible solvent, such as naphtha, toluene, ethylene dichloride, trichloroethane, and turpentine solvents, in which solutions the preserved foliage is immersed and allowed to remain, preferably at room temperature, until substantially saturated therewith, whereupon the foliage is removed and the volatile constituents are allowed to evaporate.

As used herein "water-soluble" and "water-miscible" signifies a solubility in water of at least 5 parts per 100 parts of water at 75° F., while "water-insolubility" and "water-immiscibility" signify a solubility in water of less than 1 part per 100 parts of water at 75° F.

The term "volatile" as used herein signifies that a substance has a vapor pressure greater than 1 mm. of mercury at 75° F.

The term "permeability" is the capacity of plant tissue to permit osmotic diffusion of aqueous solutions into and out of the tissue.

"Solution" as used herein includes the suspension of finely divided solids in liquids as well as true ionic dissociation therein.

"Polyhydric" in reference to alcohols includes dihydric glycols as well as alcohols having three or more hydroxyls, such as glycerol, sorbitol and the like.

The following examples will further explain the invention and the manner of its practical application, all parts indicated therein being by weight.

Example I

Freshly picked leaves of *Magnolia grandiflora* were placed in a solution consisting of aluminum sulfate, 2 parts; sodium borate, 3 parts; neutral monoethanolamine sulfamate, 30 parts; acetic acid, 10 parts; water, 55 parts. The leaves were allowed to remain submerged until they became permeated with the solution, which required approximately 4 weeks at room temperature, and they were then removed, and after being rinsed in water were allowed to stand in freely circulating air for 1 week by which time all detectable odor of acetic acid had disappeared. A second batch of Magnolia leaves was treated in similar manner with the exception that the temperature of the solution was maintained at 125° F., and were removed therefrom in 2 weeks by which time they had become permeated with the solution.

The leaves in both batches, after exposure to the air for 1 week, retained their original shape and texture, and were found to have become toughened and flexible. Certain of these preserved leaves were coated with pigmented lacquers which provided desirable finishes for them, and the lacquers when allowed to dry completely.

All these preserved leaves, including the uncoated ones were then subjected for 5 days to air having a relative humidity of 20%. When examined at the end of this period they were found to be substantially unchanged in shape and they were reasonably flexible and tough. These same leaves were then subjected for 5 days to air having 80% relative humidity, and upon examination at the end of this period their shape was found to be substantially unchanged and their flexibility and toughness moderately increased.

Example II

Freshly cut pieces of English ivy (*Hedera helix*) with leaves attached were placed in a solution consisting of aluminum acetate, 1 part; sodium borate, 4 parts; sodium bisulfite, anhydrous, 3 parts; neutral triethanolamine sulfamate, 30 parts; acetic acid, 7 parts; water, 55 parts. The material was allowed to remain submerged until the leaves and stems became permeated with the solution, which took place in approximately three weeks at 115° F. The material was then removed and, after being rinsed in water, was exposed to freely circulating air until all detectable odor of acetic acid and/or sulfur dioxide had disappeared, which required approximately two weeks.

Certain of the pieces were then coated with green pigmented paint, and, when the paint had dried completely, were, together with uncoated pieces, subjected for 5 days to air having a relative humidity of 20%. Upon inspection under these conditions it was noted that the preserved leaves and stems were substantially unchanged in shape and that they had retained a substantial degree of flexibility and toughness. These same preserved leaves were subsequently exposed for 5 days to air having a relative humidity of 80%, and at the end of the exposure period were found to be substantially unchanged in shape and their flexibility and toughness were moderately increased.

Example III

Specimens of *Lycopodium obscurum* were immersed in a solution consisting of sodium bisulfite, anhydrous, 15 parts, and water, 85 parts; and were allowed to remain therein for 6 weeks. They were then removed and placed in a bath of running water for two days, following which they were transferred to a bleaching bath consisting of peracetic acid, 2 parts; sodium tripolyphosphate, 3 parts; and water, 95 parts. The temperature of the bleaching bath was maintained at 115° F. for 24 hours, during which time the specimens became substantially colorless, whereupon they were transferred to a bath of running water and allowed to remain therein for 24 hours.

The Lycopodium specimens, thus prepared, were then put directly into a solution consisting of aluminum ammonium sulfate, 2 parts; sodium borate, 3 parts; neutral monoethanolamine chloride, 20 parts; acetic acid, 10 parts; urea, 3 parts; ammonium sulfate, 2 parts; polyethylene glycol (molecular weight 200), 10 parts; water, 47 parts; isopropyl alcohol, 3 parts; and a small quantity of acid dye Croceine scarlet 3 BX. The prepared material was allowed to remain submerged in this solution for two weeks during which time the temperature was maintained at 140° F., and it was then removed and rinsed in water. It was found to be permeated with the dyeing solution, and its color appeared scarlet throughout.

The material was thereupon allowed to remain exposed to freely circulating air for one week, after which time no acetic odor was detected. It was then subjected for 5 days to air having a relative humidity of 20%, and upon inspection at the end of this period it was found to have retained its original shape and it was substantially flexible and tough. Following this, the same material was subjected for five days to air having a relative humidity of 80%, and upon inspection at the end of this period it was found that the shape was substantially unchanged and the flexibility and toughness were moderately increased.

Example IV

Branches of a cultivated variety of Lencothoe Catesbaei (*L. editorum*) bearing several leaves each were placed in a solution consisting of anhydrous sodium sulfite, 5 parts; morpholine, 2 parts; isopropyl alcohol, 3 parts; water, 90 parts. The material was allowed to remain submerged in this solution for 5 weeks, during which period the temperature was maintained for the first 3 weeks at approximately 80° F., and for the remaining 2 weeks at 125° F. The material was then removed from the solution and upon inspection was found to have become uniformly permeated therewith and both leaves and stems were brown in color. It was thereupon rinsed in water and then transferred into a bleaching bath consisting of peracetic acid, 1.5 parts; sodium tripolyphosphate, 2 parts; and water, 97.5 parts. The temperature of the bath was maintained at 125° F., and at the end of 20 hours the foliage had become substantially colorless. It was then transferred to a bath of running water and soaked for 24 hours.

The bleached material was then put directly into a solution consisting of aluminum sulfate, 1 part; sodium borate, 3 parts; neutral isopropanolamine sulfamate, 20 parts; acetic acid, 10 parts; sodium citrate, U.S.P. VII, 4 parts; urea, 5 parts; ammonium sulfate, 3 parts; polyethylene glycol (molecular weight 200), 8 parts; polyoxyethylene phenyl ether, 3 parts; water, 40 parts; isopropyl alcohol, 3 parts; and a small quantity of acid dye consisting of blue, yellow and orange colors in a combination that provided a leaf-green shade. The material was allowed to remain for 10 days in this preserving and dyeing solution and the temperature was maintained at 125° F. The material was removed at the end of this period and was found to be permeated with the solution and to be green in color throughout. It was thereupon rinsed in water and allowed to remain exposed to freely circulating air for one week, after which time no acetic odor was detected.

The foliage thus preserved and dyed was found to have retained its original shape and it was reasonably flexible and tough. It was subsequently subjected to 20% and to 80% relative humidity conditions, respectively, for periods of 5 days each, and the above mentioned characteristics were retained within reasonable limits throughout the range of the tests.

Having thus described my invention, I claim:

1. In the method of preserving foliage, the steps comprising immersing the foliage in an aqueous solution comprising a humectant having bactericidal and germicidal properties; an aluminum salt which is water-soluble below a given pH and water-insoluble above said pH; and a water-soluble volatile fatty acid present in an amount to maintain the solution below said pH; allowing the foliage to remain in said solution until the tissues thereof are permeated therewith, and then removing the foliage from said solution and allowing the volatile constituents to evaporate from the permeated tissues.

2. In the method of preserving foliage, the steps comprising immersing the foliage in an aqueous solution of a humectant having bactericidal and germicidal properties; said solution containing also a water-soluble aluminum salt; at least one alkaline salt formed with an acid selected from the group consisting of boric, molybdic and phosphoric acids and an alkaline radical selected from the group consisting of sodium, potassium, and ammonium, said acids being capable of forming substantially water-insoluble compounds with aluminum; and a volatile fatty acid selected from the group consisting of formic, acetic, propionic, and butyric, said fatty acid being present in an amount to maintain the solution at a pH below 6.0, allowing the foliage to remain in said solution until the tissues thereof are permeated therewith, and then removing the foliage from the aqueous solution and allowing the volatile constituents to evaporate from the permeated tissues.

3. The method as defined by claim 2 in which the humectant is a neutral salt of a water-soluble aliphatic amine of not more than 9 carbon atoms formed with an acid selected from the group consisting of boric, hydrochloric, molybdic, phosphoric, sulfamic and sulfuric acids.

4. The method as defined by claim 2 in which the humectant is a neutral salt of an aliphatic amine, said amine being selected from the group consisting of monoethanolamine, diethanolamine, triethanolamine, monoisopropanolamine, diisopropanolamine, triisopropanolamine, monoethylamine, diethylamine and triethylamine.

5. In the method of preserving foliage, the steps comprising immersing the foliage in an aqueous solution of a neutral salt of a water-soluble aliphatic amine of not more than 9 carbon atoms as a humectant having germicidal and bactericidal properties; said solution containing a water-soluble aluminum salt capable of reacting with an alkaline salt the alkaline radical of which is selected from the group consisting of sodium, potassium, and ammonium to form a water-insoluble aluminum compound; and a volatile fatty acid having not more than 4 carbon atoms in an amount to maintain the solution at a pH below 6.0; allowing the foliage to remain in the solution until the tissues thereof become permeated therewith, then removing the foliage from the solution and allowing the volatile constituents to evaporate from the foliage tissues.

6. In the method of preserving foliage, the steps comprising immersing the foliage in an aqueous solution, said solution comprising, by weight, 15 to 40 parts of a humectant having bactericidal and germicidal properties; 0.5 to 5.0 parts of a water-soluble aluminum salt, 1 to 10 parts of at least one alkaline salt formed with an acid selected from the group consisting of boric, molybdic and phosphoric acids, the alkaline radical being selected from the group consisting of sodium, potassium, and ammonium, said salt being capable of forming substantially water-insoluble compounds with aluminum; a volatile fatty acid selected from the group consisting of formic, acetic, propionic and butyric, said fatty acid being present in an amount to maintain the solution at a pH below 6.0; and sufficient water to make up 100 parts of solution, allowing the foliage to remain in said solution until the tissues thereof are permeated therewith, and then removing the foliage from said aqueous solution and allowing the volatile constituents to evaporate from the permeated tissues.

7. A composition of matter for use in the preservation of foliage comprising an aqueous solution of a humectant having germicidal and bactericidal properties, said solution containing a water-soluble aluminum salt, an alkaline salt capable of reacting with the aluminum salt in the solution to form water-insoluble aluminum compounds at a pH above 6.0, and a volatile fatty acid in an amount to maintain the solution below pH 6.0.

8. A composition of matter as defined by claim 7 in which the humectant is a neutral salt formed of a water-soluble aliphatic amine of not more than 9 carbon atoms with an acid selected from the group consisting of boric, hydrochloric, molybdic, phosphoric, sulfamic and sulfuric acids.

9. A composition of matter as defined by claim 7 in which the humectant is formed with an alkylamine selected from the group consisting of monoethanolamine, diethanolamine, triethanolamine, monoisopropanolamine, diisopropanolamine, triisopropanolamine, monoethylamine diethylamine and triethylamine.

10. A composition of matter as defined by claim 7 in which the aluminum salt is selected from the group consisting of aluminum acetate, aluminum formate, aluminum glycolate, aluminum lactate and aluminum sulfate.

11. A composition of matter as defined by claim 7 in which the alkaline salt is selected from the group consisting of potassium, sodium and ammonium borates, molybdates and phosphates.

12. A composition of matter for use in the preservation of foliage, comprising an aqueous solution of aluminum sulfate, sodium borate, monoisopropanolamine sulfamate, and sufficient acetic acid to maintain the solution in a pH range below 6.0.

References Cited in the file of this patent

UNITED STATES PATENTS

| | | |
|---|---|---|
| 326,088 | Alexanderson | Sept. 15, 1885 |
| 1,194,608 | Eastman | Aug. 15, 1916 |
| 1,956,908 | Neubert | May 1, 1934 |
| 2,013,063 | Miller | Sept. 3, 1935 |
| 2,381,863 | Benignus | Aug. 14, 1945 |
| 2,423,619 | Roon | July 8, 1947 |
| 2,471,339 | Minich et al. | May 24, 1949 |
| 2,562,488 | Fuchs | July 31, 1949 |
| 2,567,929 | Fessenden | Sept. 18, 1951 |
| 2,720,726 | Ferguson | Oct. 18, 1955 |